United States Patent
Ben-Ari et al.

(10) Patent No.: US 11,172,468 B2
(45) Date of Patent: Nov. 9, 2021

(54) SELECTION OF PHYSICAL SIDELINK SHARED CHANNEL MESSAGES TO ATTEMPT TO RECEIVE

(71) Applicant: QUALCOMM Incorporated, San Diego, CA (US)

(72) Inventors: Moshe Ben-Ari, Rehovot (IL); Shay Landis, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 16/846,225

(22) Filed: Apr. 10, 2020

(65) Prior Publication Data
US 2021/0321364 A1 Oct. 14, 2021

(51) Int. Cl.
| | |
|---|---|
| *H04W 72/04* | (2009.01) |
| *H04W 72/02* | (2009.01) |
| *H04W 28/02* | (2009.01) |
| *H04L 1/00* | (2006.01) |
| *H04W 92/18* | (2009.01) |

(52) U.S. Cl.
CPC ........... *H04W 72/02* (2013.01); *H04L 1/0003* (2013.01); *H04W 28/0268* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 2012/0076227 A1* | 3/2012 | Taoka | ................... | H04L 1/0026 375/267 |
| 2018/0167950 A1* | 6/2018 | Vanninen | ................. | H04L 5/006 |
| 2019/0394786 A1* | 12/2019 | Parron | ................. | H04L 27/0006 |
| 2021/0099262 A1* | 4/2021 | El Asmar | ............... | H04B 17/27 |

* cited by examiner

*Primary Examiner* — Ayanah S George
(74) *Attorney, Agent, or Firm* — QUALCOMM Incorporated

(57) ABSTRACT

Various aspects of the present disclosure generally relate to wireless communication. In some aspects, a user equipment may determine a set of channel quality metrics associated with a set of physical sidelink control channel (PSCCH) messages; and determine, based at least in part on the set of channel quality metrics, a subset of physical sidelink shared channel (PSSCH) messages, of a set of PSSCH messages, to attempt to receive. Numerous other aspects are provided.

30 Claims, 7 Drawing Sheets

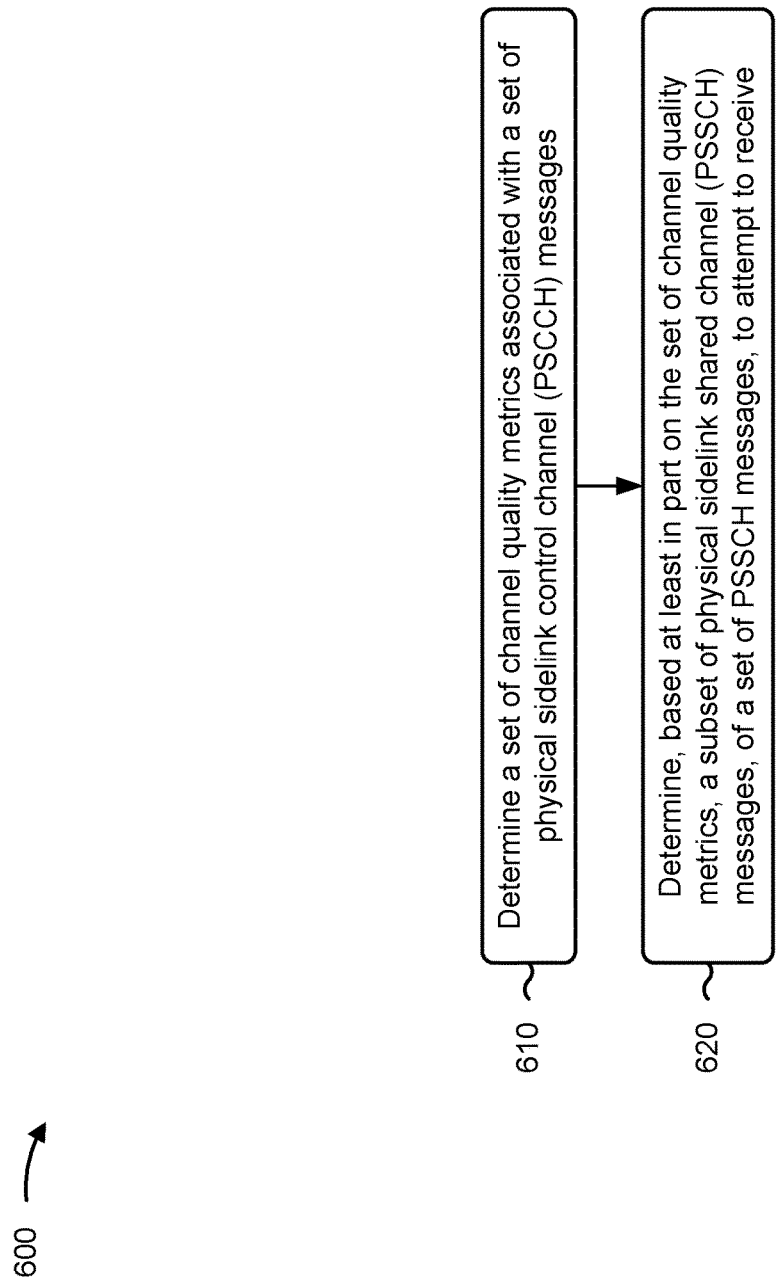

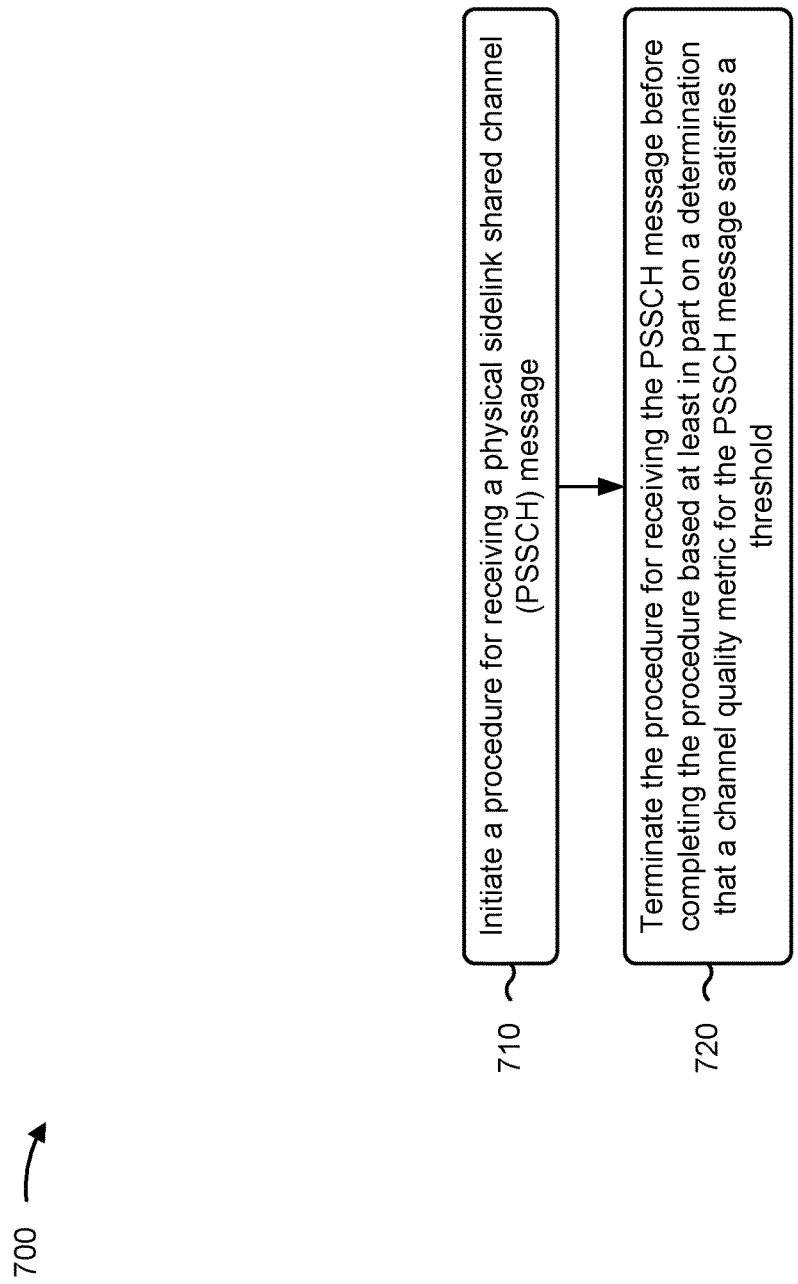

SELECTION OF PHYSICAL SIDELINK SHARED CHANNEL MESSAGES TO ATTEMPT TO RECEIVE

FIELD OF THE DISCLOSURE

Aspects of the present disclosure generally relate to wireless communication and to techniques and apparatuses for selection of physical sidelink shared channel (PSSCH) messages to attempt to receive.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment, may include determining a set of channel quality metrics associated with a set of physical sidelink control channel (PSCCH) messages; and determining, based at least in part on the set of channel quality metrics, a subset of physical sidelink shared channel (PSSCH) messages, of a set of PSSCH messages, to attempt to receive.

In some aspects, a method of wireless communication, performed by a user equipment, may include initiating a procedure for receiving a PSSCH message; and terminating the procedure for receiving the PSSCH message before completing the procedure based at least in part on a determination that a channel quality metric for the PSSCH message satisfies a threshold.

In some aspects, a user equipment for wireless communication may include a memory and one or more processors operatively coupled to the memory. The memory and the one or more processors may be configured to determine a set of channel quality metrics associated with a set of PSCCH messages; and determine, based at least in part on the set of channel quality metrics, a subset of PSSCH messages, of a set of PSSCH messages, to attempt to receive.

In some aspects, a user equipment for wireless communication may include a memory and one or more processors operatively coupled to the memory. The memory and the one or more processors may be configured to initiate a procedure for receiving a PSSCH message; and terminate the procedure for receiving the PSSCH message before completing the procedure based at least in part on a determination that a channel quality metric for the PSSCH message satisfies a threshold.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a UE, in accordance with various aspects of the present disclosure.

FIG. 7 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
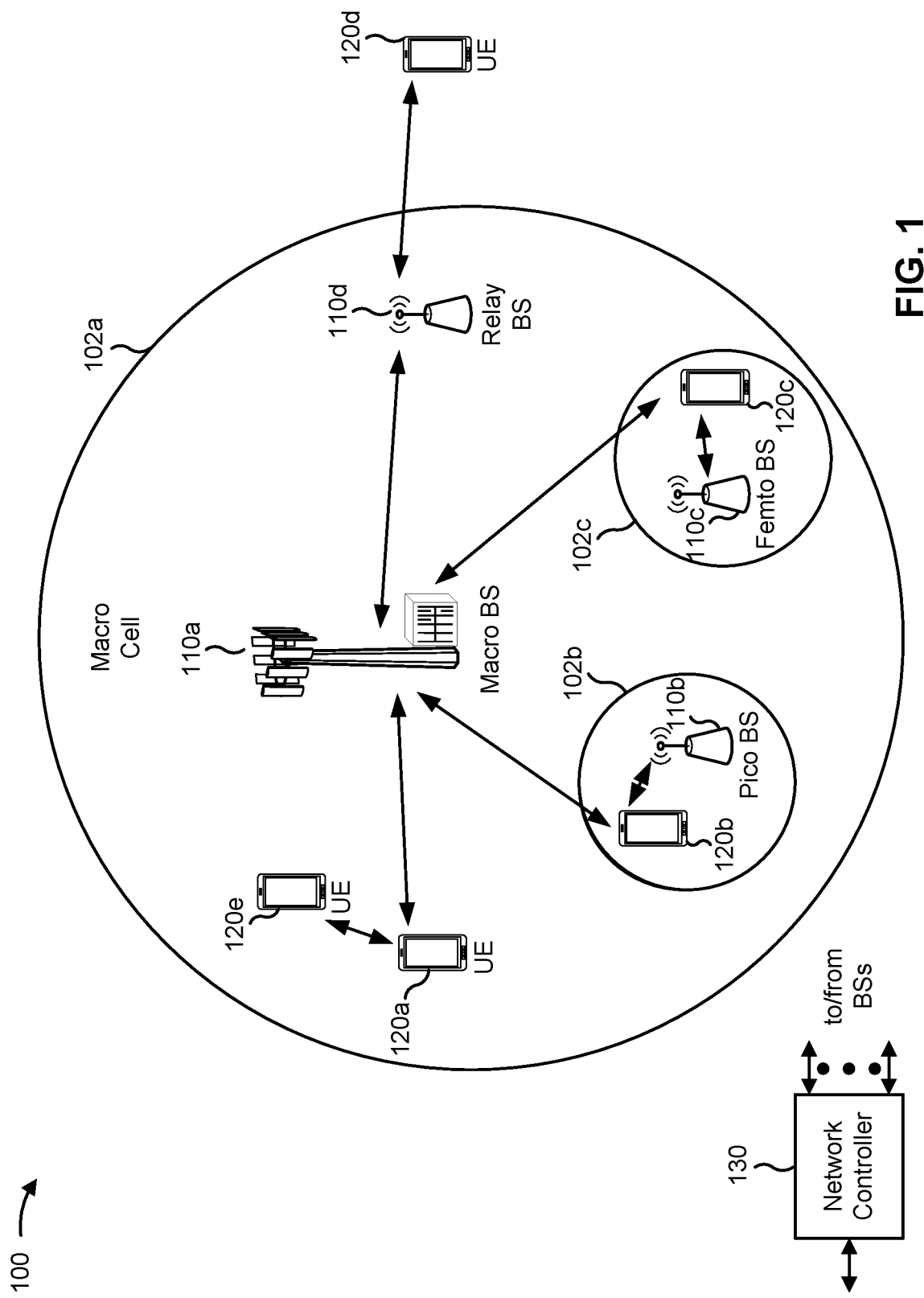
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X, cellular V2X, or C-V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
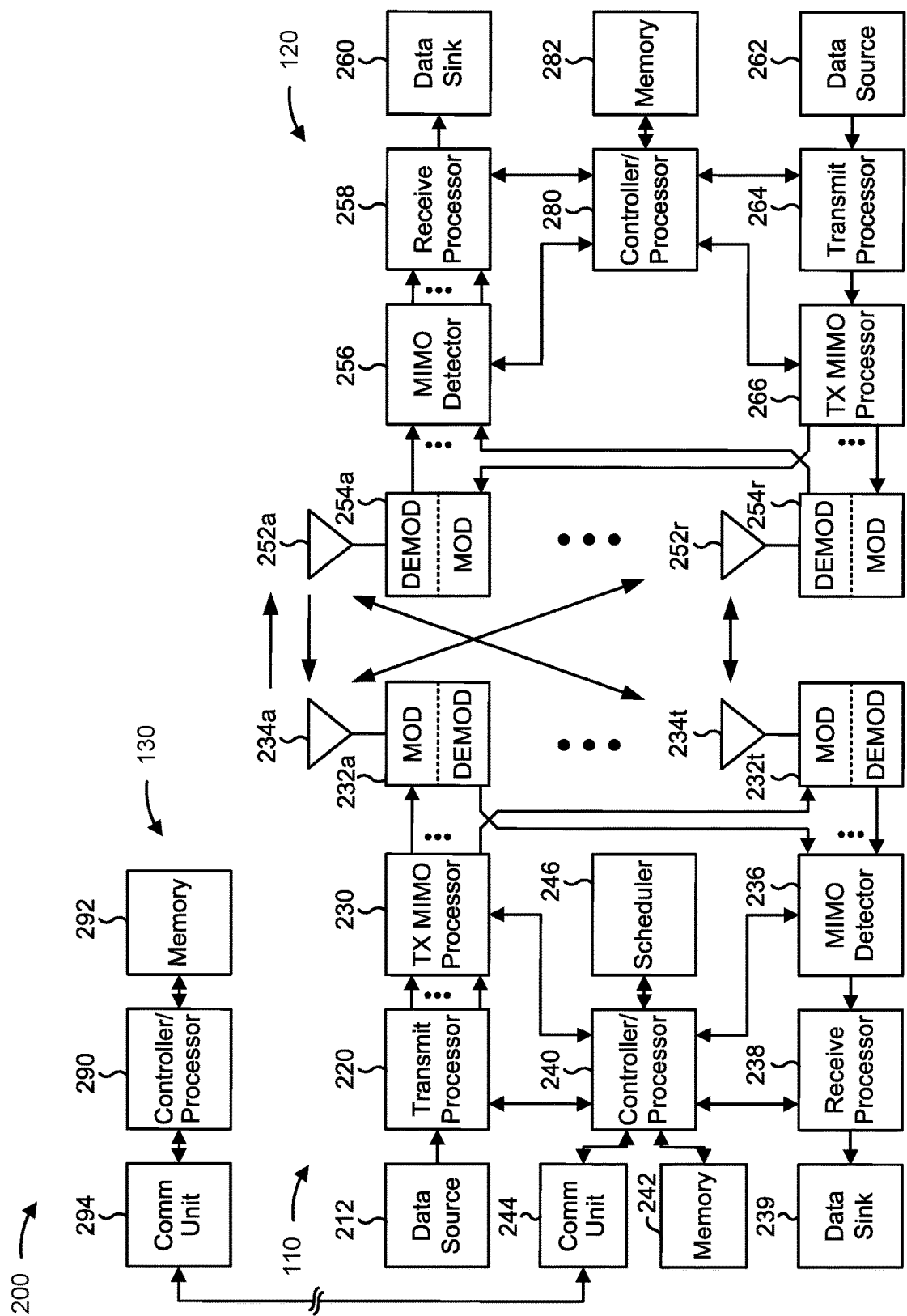
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with selection of PSSCH messages to attempt to receive, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 600 of FIG. 6 and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining a set of channel quality metrics associated with a set of PSCCH messages; means for determining, based at least in part on the set of channel quality metrics, a subset of PSSCH messages, of a set of PSSCH messages, to attempt to receive; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
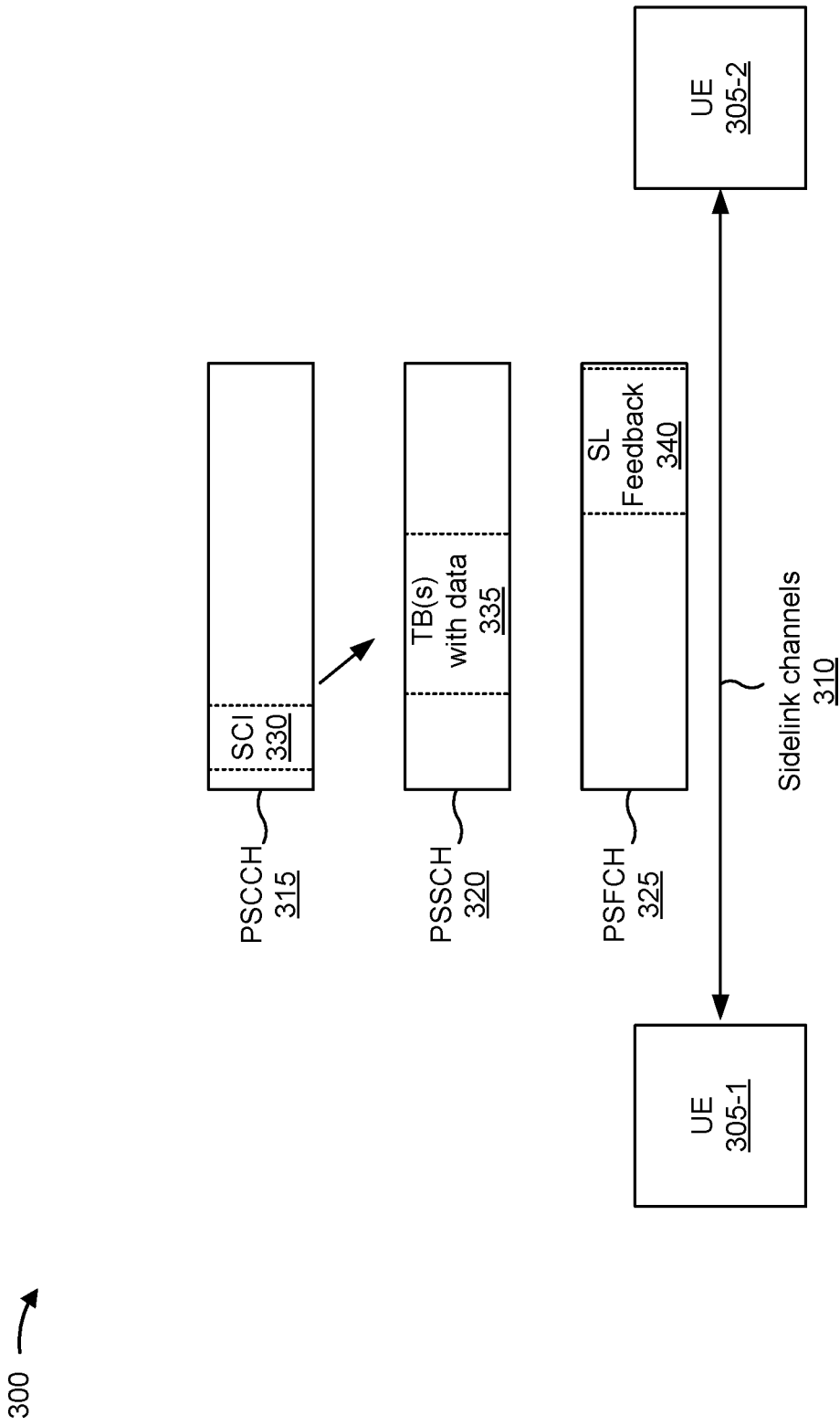
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a PSCCH 315, a PSSCH 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. In some aspects, the control information may be transmitted in two stages. In some aspects, the first stage may include transmitting a first set of SCI fields and the second stage may include transmitting a second set of SCI fields. The transmission of the second set of SCI fields may be with a PSSCH 320 transmission and may be included on a first portion of resources carrying the PSSCH 320 transmission. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time and/or frequency. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with each of various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with each of various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
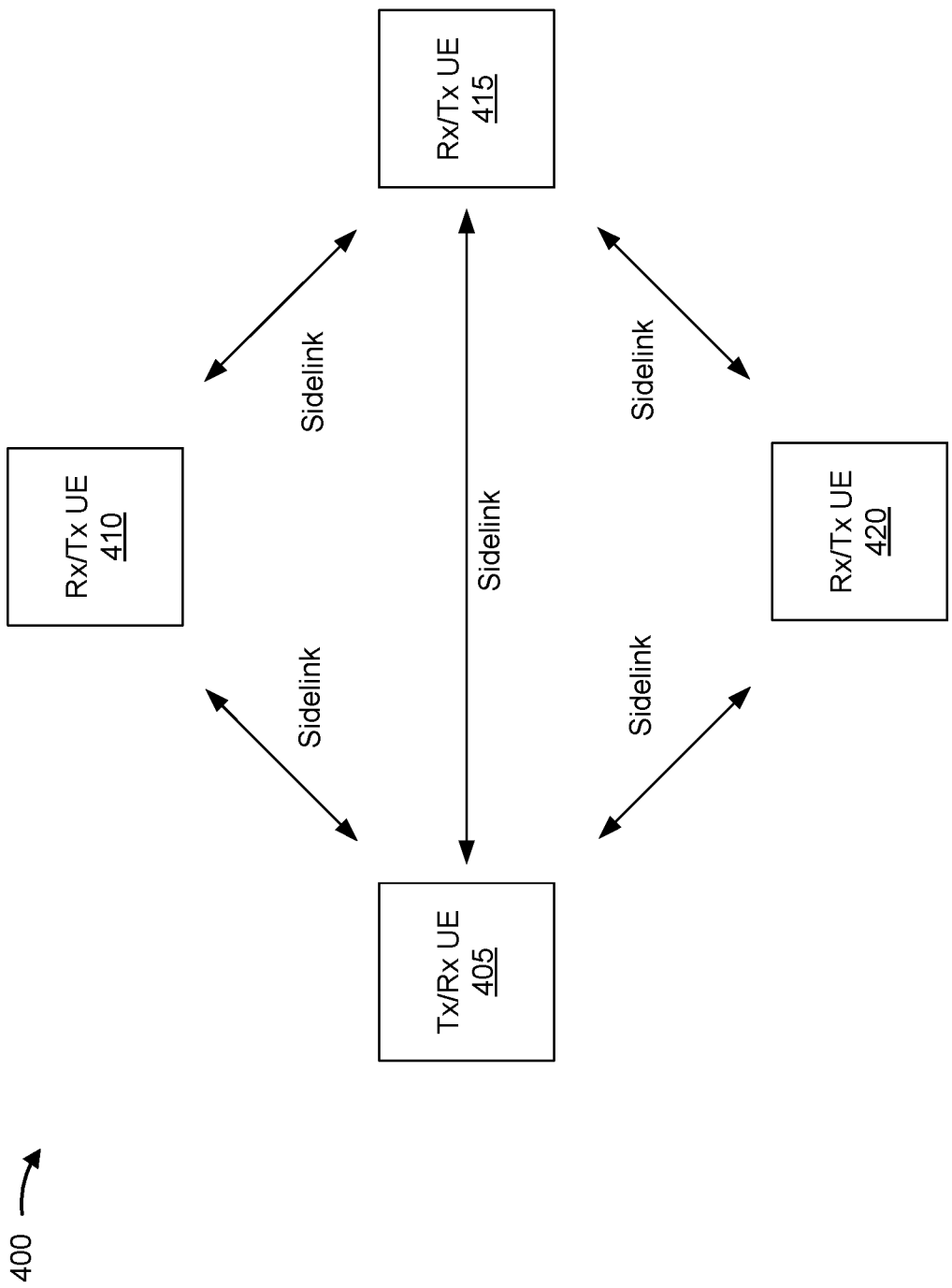
FIG. 4 is a diagram illustrating an example of sidelink communications, in accordance with various aspects of the present disclosure.

FIG. 4 is a diagram illustrating an example 400 of sidelink communications, in accordance with various aspects of the present disclosure. As shown, multiple Rx/Tx UEs (e.g., Rx/Tx UE 405, Rx/Tx UE 410, Rx/Tx UE 415, Rx/Tx UE 420, and/or the like) may communicate with one another via one or more sidelinks, as described above in connection with FIG. 3. The multiple Rx/Tx UEs may correspond to one or more UEs described elsewhere herein. Thus, a sidelink may refer to a direct link between UEs. Sidelink communications may be transmitted via the sidelink. In some aspects, the multiple Rx/Tx UEs may communicate using a PC5 interface (e.g., without involvement from a base station or other centralized scheduling agent).

In some aspects, a base station may also communicate with the Tx/Rx UEs 405, 410 via access links. An access link communication may be either a downlink communication (from a base station to a UE) or an uplink communication (from a UE to a base station).

As indicated above, FIG. 4 is provided as an example. Other examples may differ from what is described with respect to FIG. 4.

In some networks using P2P communications, such as C-V2X communications, a UE may receive a set of PSCCH messages and, based at least in part on the set of PSCCH messages, the UE may attempt to receive PSSCH messages associated with the PSCCH messages. For example, the UE may receive pairs of PSCCH messages and associated PSSCH messages from transmitting UEs. The UE may receive (e.g., receive, decode, process, and/or the like) a PSCCH message to determine one or more parameters for receiving an associated PSSCH message.

For a UE that receives multiple PSCCH messages, the UE may be limited (e.g., based at least in part on one or more components of the UE, timing, and/or the like) in how many PSSCH messages the UE may receive. Additionally, or alternatively, the UE may prefer to limit power consumption, heat generation, batter consumption, and/or the like that may be associated with receiving PSSCH messages. If a number of PSSCH messages is more than the UE is able to receive, the UE may choose which of the PSSCH messages to receive based at least in part on a random selection process, a timing of receiving associated PSCCH messages, and/or the like. In this way, the UE may attempt to receive one or more messages that have relatively low relevance to the UE, are associated with a relatively poor channel quality (e.g., with a relatively low likelihood of being received), and/or the like and the UE may fail to attempt to receive one or more messages that have a relatively high relevance to the UE, are associated with a relatively good channel quality (e.g., with a relatively high likelihood of being received), and/or the like. This may cause the UE to miss messages with relatively high relevance to the UE (e.g., a warning message from a nearby vehicle), consume computing resources of the UE and/or unnecessarily generate heat to attempt to receive a message with relatively low relevance to the UE and/or a relatively low likelihood of being received, and/or the like.

In some aspects described herein, a UE (e.g., UE 120) may determine a set of channel quality metrics associated with a set of PSCCH messages that are associated with a set of PSSCH messages. Based at least in part on the set of channel quality metrics, the UE may determine a subset of the PSSCH messages to attempt to receive. For example, the UE may have a processing budget that limits a number of messages that the UE may receive. The UE may determine which of the PSSCH messages to include in the subset based at least in part on the PSSCH messages to include in the subset being associated with the best channel quality metrics (e.g., being associated with PSCCH messages that are associated with the best channel quality metrics). In some aspects, the UE may determine which of the messages to include in the subset based at least in part on the PSSCH messages to include in the subset being associated with channel quality metrics that satisfy a threshold (e.g., being associated with PSCCH messages that are associated with channel quality metrics that satisfy the threshold). In other words, the UE may determine to attempt to receive PSSCH messages that the UE is likely to be able to receive, based at least in part on the channel quality metrics.

In some aspects described herein, a UE (e.g., 120) may initiate a procedure for receiving a PSSCH message. The UE may determine a channel quality metric for the PSSCH message during the procedure and may terminate the procedure before completion based at least in part on the channel quality metric satisfying a threshold. In some aspects, the UE may determine to terminate the procedure based at least in part on a probability of receiving the PSSCH message satisfying a threshold (e.g., is too low) based at least in part on the channel quality metric.

In this way, the UE may determine to attempt to receive PSSCH messages based at least in part on channel quality metrics, which may allow the UE to prioritize PSSCH messages that are likely to be received, avoid consumption of computing resources and generation of heat that may have otherwise been associated with attempting to receive PSSCH messages with a relatively low likelihood of being received, and/or the like. In some aspects, the UE may filter out PSSCH messages with relatively low relevance to the UE based at least in part on the PSSCH messages with relatively low relevance to the UE being transmitted from transmitting UEs that are relatively far from the UE, do not have a line of sight to the UE, and/or the like.

Figure 5:
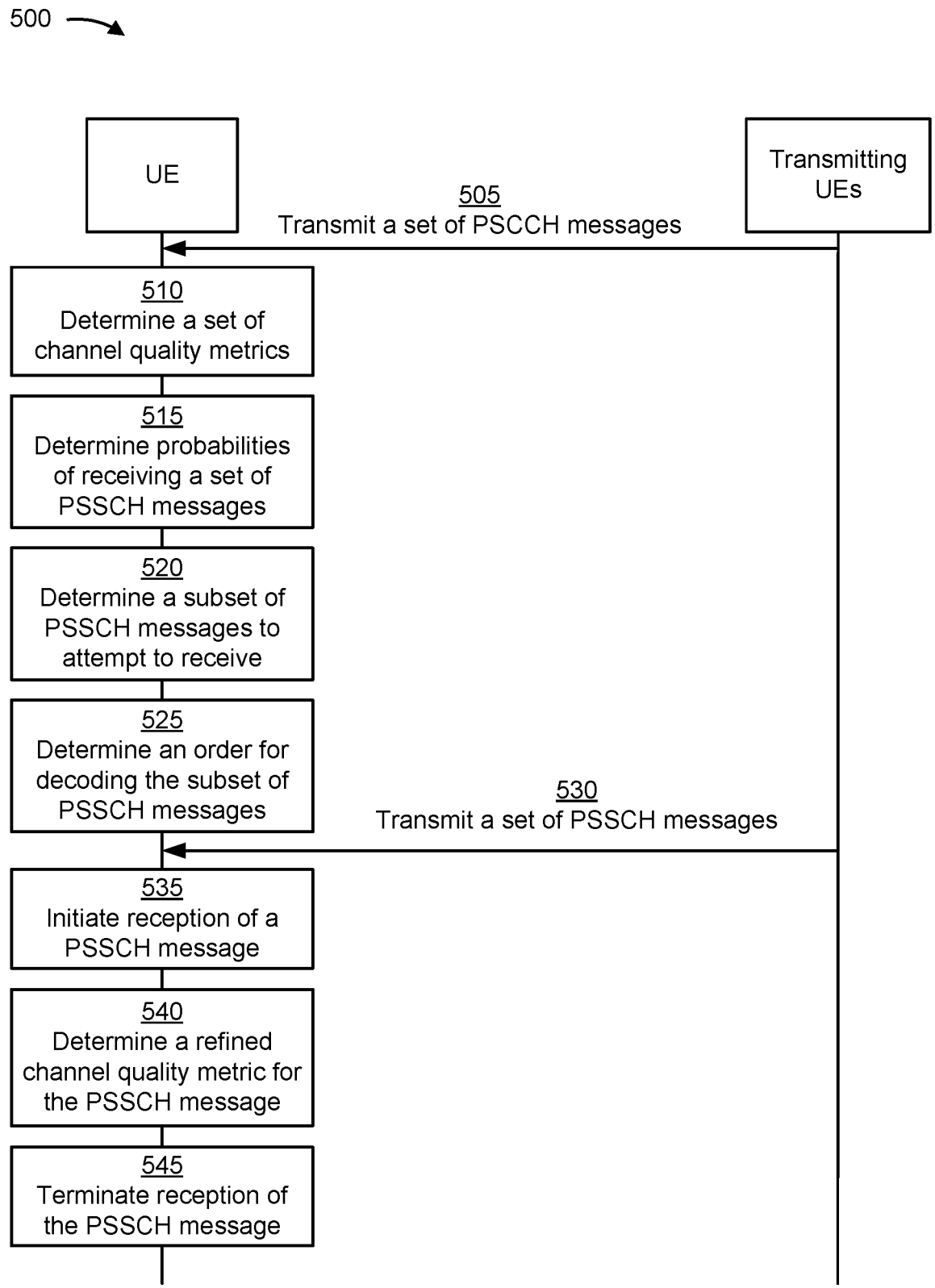
FIG. 5 illustrates an example of selection of PSSCH messages to attempt to receive, in accordance with various aspects of the present disclosure.

FIG. 5 illustrates an example 500 of selection of PSSCH messages to attempt to receive, in accordance with various aspects of the present disclosure. As shown in FIG. 5, a UE (e.g., UE 120) may receive messages from multiple transmitting UEs (e.g., UEs 120). In some aspects, the UE and/or the transmitting UEs may be associated with a vehicle, may communicate using a C-V2X protocol, and/or the like.

As shown by reference number 505, the transmitting UEs may transmit a set of PSCCH messages. In some aspects, the set of PSCCH messages may be associated with corresponding PSSCH messages. In some aspects, the PSCCH messages may identify one or more parameters for receiving the corresponding PSSCH messages. For example, the PSCCH messages may indicate MCSs, communication resources, priorities, and/or the like of the corresponding PSSCH messages.

As shown by reference number 510, the UE may determine a set of channel quality metrics associated with the PSCCH messages. For example, the UE may determine a signal to noise ratio, a signal to interference plus noise ratio, a channel estimation, and/or the like. For example, the UE may perform channel estimation including detecting phase, power, time, and/or frequency shifts due to receiving multiple iterations (received on different paths) of a PSCCH message to determine a channel quality associated with the PSCCH message. In some aspect, the UE may determine channel capacities (e.g., based at least in part on the signal to noise ratio, the signal to interference plus noise ratio, the channel estimation, and/or the like) as the channel quality metrics or associated with the channel quality metrics. In some aspects, the channel quality metrics may be referenced as inverse channel quality indicators (e.g., based at least in part on indicating a probability of reception of a PSSCH messages using a channel associated with the PSCCH).

In some aspects, the UE may determine that a channel quality metric satisfies a threshold (e.g., is below the threshold) without completing a procedure for receiving a PSCCH message. For example, the UE may initiate the procedure for receiving the PSCCH message, determine that a corresponding channel quality metric satisfies the threshold, and terminate the procedure for receiving the PSCCH message before completing the procedure. In this way, the UE may conserve computing resources and avoid unnecessary heat generation by completing the process for receiving the PSCCH message once the UE has determined to not attempt to receive an associated PSSCH message.

As shown by reference number 515, the UE may determine probabilities of receiving the set of PSSCH messages. For example, the UE may determine the probabilities of receiving the set of PSSCH messages based at least in part on the set of channel quality metrics. In some aspects, the UE may determine the probabilities of receiving the set of PSSCH messages using a table, a chart, a formula, a data structure, and/or the like. For example, the UE may compare the channel quality metric with a table or chart that is calculated offline and used to associate particular channel quality metrics with particular probabilities of reception. In some aspects, the UE may locally store one or more tables or charts that are associated with different parameters (e.g., channel capacities).

In some aspects, the UE may use MCSs indicated in the PSCCH messages in determinations of the probabilities of receiving the set of PSSCH messages. For example, the UE may have a relatively high probability of receiving a PSCCH message with a relatively low data rate and a relatively low probability of receiving a PSCCH message with a relatively high data rate when channel conditions are poor. In other words, the probabilities of receiving PSSCH messages of the set of PSSCH messages may be based at least in part on the channel quality metrics and the MCSs of the PSSCH messages (e.g., as indicated in corresponding PSCCH messages). In some aspects, the UE may determine whether to include a particular PSSCH message in a subset of PSSCH messages to attempt to receive based at least in part on the channel quality metrics and the MCSs of the PSSCH messages.

As shown by reference number 520, the UE may determine a subset of PSSCH messages to attempt to receive. For example, the UE may determine the subset of PSSCH messages, of the set of PSSCH messages associated with the set of PSCCH messages, to attempt to receive based at least in part on the set of channel quality metrics. In some aspects, the UE may select the subset of PSSCH messages based at least in part on the probabilities of receiving the set of PSSCH messages.

In some aspects, the UE may select the subset of PSSCH messages based at least in part on the probabilities of receiving the subset of PSSCH messages satisfying a threshold probability. In this way, the UE may filter out PSSCH messages based at least in part on the filtered PSSCH messages having a relatively low probability of being received. In some aspects, the UE may select a predetermined number of the set of PSSCH messages to include in the subset of PSSCH messages (e.g., based at least in part on the set of channel quality metrics). For example, the predetermined number may be based at least in part on a processing budget of the UE.

As shown by reference number 525, the UE may determine an order for decoding the subset of PSSCH messages. In some aspects, the order may be based at least in part on the set of channel quality metrics. In some aspects, the order may be determined as part of a same process of selecting the subset of PSSCH messages. In other words, the UE may rank the set of PSSCH messages (e.g., based at least in part on the channel quality metrics associated with the set of PSCCH messages) of the set of PSSCH messages and select a number of the highest ranked PSSCH messages, and then maintain the ranking to determine the order for decoding the subset of PSSCH messages.

As shown by reference number 530, the transmitting UEs may transmit the set of PSSCH messages (e.g., the set of PSSCH messages that are associated with the set of PSCCH messages). In some aspects, the UE may identify the subset of PSSCH messages based at least in part on the parameters indicated in PSCCH messages of the set of PSSCH messages that are associated with the subset of PSSCH messages. In some aspects, the UE may ignore (e.g., not attempt to receive) PSSCH messages that are not included in the subset of PSSCH messages.

In this way, the UE may conserve computing resources and reduce heat generation that may otherwise be associated with attempting to receive PSSCH messages of the set of PSSCH messages with a relatively low probability of being received by the UE. The UE may also be able to prioritize reception of PSSCH messages that are likely to be relevant to the UE (e.g., based at least in part on being associated with PSCCH messages that are associated with relatively good channel quality metrics).

As shown by reference number 535, the UE may initiate reception of a PSSCH message. For example, the UE may initiate a procedure for receiving a PSSCH message of the subset of PSSCH messages. In some aspects, the UE may begin processing, demodulating, and/or decoding the PSSCH message.

As shown by reference number 540, the UE may determine an additional channel quality metric for the PSSCH message (e.g., using updated information from the PSSCH). In some aspects, the UE may determine that the additional channel quality metric for the PSSCH message satisfies a threshold. In some aspects, the UE may determine that, based at least in part on the additional channel quality metric, the UE has a relatively low probability of receiving (e.g., demodulating, decoding, and/or the like) the PSSCH message.

As shown by reference number 545, the UE may terminate reception of the PSSCH message. For example, the UE may terminate the procedure for receiving the PSSCH message before completing the procedure. In other words, a remaining portion of the reception process (e.g., demodulating, decoding, and/or the like) may be dropped. In this way, the UE may conserve computing resources and heat generation that may otherwise be associated with attempting to receive PSSCH messages of the subset of PSSCH messages based on the additional channel quality metric indicating a relatively low probability of being received by the UE.

As indicated above, FIG. 5 is provided as an example. Other examples may differ from what is described with respect to FIG. 5.

FIG. 6 is a diagram illustrating an example process 600 performed, for example, by a UE, in accordance with various aspects of the present disclosure. Example process 600 is an example where the UE (e.g., UE 120 and/or the like) performs operations associated with selection of PSSCH messages to attempt to receive.

As shown in FIG. 6, in some aspects, process 600 may include determining a set of channel quality metrics associated with a set of PSCCH messages (block 610). For example, the UE (e.g., using receive processor 258, controller/processor 280, memory 282, and/or the like) may determine a set of channel quality metrics associated with a set of PSCCH messages, as described above.

As further shown in FIG. 6, in some aspects, process 600 may include determining, based at least in part on the set of channel quality metrics, a subset of PSSCH messages, of a set of PSSCH messages, to attempt to receive (block 620). For example, the UE (e.g., using receive processor 258, controller/processor 280, memory 282, and/or the like) may determine, based at least in part on the set of channel quality metrics, a subset of PSSCH messages, of a set of PSSCH messages, to attempt to receive, as described above.

Process 600 may include additional aspects, such as any single aspect or any combination of aspects described below and/or in connection with one or more other processes described elsewhere herein.

In a first aspect, process 600 includes determining, based at least in part on the set of channel quality metrics, probabilities of receiving the set of PSSCH messages, and selecting the subset of PSSCH messages based at least in part on the probabilities of receiving the set of PSSCH messages.

In a second aspect, alone or in combination with the first aspect, process 600 includes determining the probabilities of receiving the set of PSSCH messages using one or more of a table, a chart, or a formula.

In a third aspect, alone or in combination with one or more of the first and second aspects, selecting the subset of PSSCH messages based at least in part on the probabilities of receiving the set of PSSCH messages includes selecting the subset of PSSCH messages based at least in part on the probabilities of receiving the subset of PSSCH messages satisfying a threshold probability.

In a fourth aspect, alone or in combination with one or more of the first through third aspects, process 600 includes determining, based at least in part on the set of channel quality metrics, an order for decoding the subset of PSSCH messages.

In a fifth aspect, alone or in combination with one or more of the first through fourth aspects, determining the subset of PSSCH messages includes selecting, based at least in part on the set of channel quality metrics, a predetermined number of the set of PSSCH messages to include in the subset of PSSCH messages.

In a sixth aspect, alone or in combination with one or more of the first through fifth aspects, determining the subset of PSSCH messages is based at least in part on MCSs (e.g., respective MCSs) of the set of PSSCH messages.

In a seventh aspect, alone or in combination with one or more of the first through sixth aspects, process 600 includes initiating a procedure for receiving a PSCCH message of the set of PSCCH messages; determining that a corresponding channel quality metric, of the set of channel quality metrics, satisfies a threshold; and terminating the procedure for receiving the PSCCH message before completing the procedure.

In an eighth aspect, alone or in combination with one or more of the first through seventh aspects, process 600 includes initiating a procedure for receiving a PSSCH message of the subset of PSSCH messages, determining that an additional channel quality metric for the PSSCH message satisfies a threshold, and terminating the procedure for receiving the PSSCH message before completing the procedure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 6 is a diagram illustrating an example process 600 performed, for example, by a UE, in accordance with various aspects of the present disclosure. Example process 600 is an example where the UE (e.g., UE 120 and/or the like) performs operations associated with selection of PSSCH messages to attempt to receive.

As shown in FIG. 6, in some aspects, process 600 may include determining a set of channel quality metrics associated with a set of PSCCH messages (block 610). For example, the UE (e.g., using receive processor 258, transmit processor 264, controller/processor 280, memory 282, and/or the like) may determine a set of channel quality metrics associated with a set of PSCCH messages, as described above.

As further shown in FIG. 6, in some aspects, process 600 may include determining, based at least in part on the set of channel quality metrics, a subset of PSSCH messages, of a set of PSSCH messages, to attempt to receive (block 620). For example, the UE (e.g., using receive processor 258, transmit processor 264, controller/processor 280, memory 282, and/or the like) may determine, based at least in part on the set of channel quality metrics, a subset of PSSCH messages, of a set of PSSCH messages, to attempt to receive, as described above.

Process 600 may include additional aspects, such as any single aspect or any combination of aspects described below and/or in connection with one or more other processes described elsewhere herein.

In a first aspect, process 600 includes determining, based at least in part on the set of channel quality metrics, probabilities of receiving the set of PSSCH messages and selecting the subset of PSSCH messages based at least in part on the probabilities of receiving the set of PSSCH messages.

In a second aspect, alone or in combination with the first aspect, process 600 includes determining the probabilities of receiving the set of PSSCH messages using one or more of a table, a chart, or a formula.

In a third aspect, alone or in combination with one or more of the first and second aspects, selecting the subset of PSSCH messages based at least in part on the probabilities of receiving the set of PSSCH messages includes: selecting the subset of PSSCH messages based at least in part on the probabilities of receiving the subset of PSSCH messages satisfying a threshold probability.

In a fourth aspect, alone or in combination with one or more of the first through third aspects, process 600 includes determining, based at least in part on the set of channel quality metrics, an order for decoding the subset of PSSCH messages.

In a fifth aspect, alone or in combination with one or more of the first through fourth aspects, determining the subset of PSSCH messages includes selecting, based at least in part on the set of channel quality metrics, a predetermined number of the set of PSSCH messages to include in the subset of PSSCH messages.

In a sixth aspect, alone or in combination with one or more of the first through fifth aspects, determining the subset of PSSCH messages is based at least in part on MCSs of the set of PSSCH messages.

In a seventh aspect, alone or in combination with one or more of the first through sixth aspects, process 600 includes initiating a procedure for receiving a PSCCH message of the set of PSCCH messages; determining that a corresponding channel quality metric, of the set of channel quality metrics, satisfies a threshold; and terminating the procedure for receiving the PSCCH message before completing the procedure.

In an eighth aspect, alone or in combination with one or more of the first through seventh aspects, process 600 includes initiating a procedure for receiving a PSSCH message of the subset of PSSCH messages, determining that an additional channel quality metric for the PSSCH message satisfies a threshold, and terminating the procedure for receiving the PSSCH message before completing the procedure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a UE, in accordance with various aspects of the present disclosure. Example process 700 is an example where the UE (e.g., UE 120 and/or the like) performs operations associated with selection of PSSCH messages to attempt to receive.

As shown in FIG. 7, in some aspects, process 700 may include initiating a procedure for receiving a PSSCH message (block 710). For example, the UE (e.g., using receive processor 258, transmit processor 264, controller/processor 280, memory 282, and/or the like) may initiate a procedure for receiving a PSSCH message, as described above.

As further shown in FIG. 7, in some aspects, process 700 may include terminating the procedure for receiving the PSSCH message before completing the procedure based at least in part on a determination that a channel quality metric for the PSSCH message satisfies a threshold (block 720). For example, the UE (e.g., using receive processor 258, transmit processor 264, controller/processor 280, memory 282, and/or the like) may terminate the procedure for receiving the PSSCH message before completing the procedure based at least in part on a determination that a channel quality metric for the PSSCH message satisfies a threshold, as described above.

Process 700 may include additional aspects, such as any single aspect or any combination of aspects described below and/or in connection with one or more other processes described elsewhere herein.

In a first aspect, process 700 includes determining, based at least in part on the channel quality metric, a probability of receiving the PSSCH message; and determining to terminate the procedure based at least in part on the probability of receiving the PSSCH message.

In a second aspect, alone or in combination with the first aspect, process 700 includes determining the probability of receiving the PSSCH message using one or more of a table, a chart, or a formula.

In a third aspect, alone or in combination with one or more of the first and second aspects, determining to terminate the procedure based at least in part on the probability of receiving the PSSCH message includes determining to terminate the procedure based at least in part on the probability of receiving the PSSCH message satisfying a threshold probability.

In a fourth aspect, alone or in combination with one or more of the first through third aspects, one or more of the threshold for the channel quality metric for the PSSCH message or the threshold probability are based at least in part on one or more of a processing budget of the UE, a power setting of the UE, a heat setting of the UE, a batter metric of the UE, or a temperature metric of the UE.

In a fifth aspect, alone or in combination with one or more of the first through fourth aspects, terminating the procedure is based at least in part on an MCS of the PSSCH message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining a set of channel quality metrics associated with a set of physical sidelink control channel (PSCCH) messages;
    determining, based at least in part on the set of channel quality metrics, probabilities of receiving a set of physical sidelink shared channel (PSSCH) messages; and
    selecting, based at least in part on the probabilities of receiving the set of PSSCH messages, a subset of PSSCH messages of the set of PSSCH.

2. The method of claim 1, wherein the probabilities of receiving the set of PSSCH messages are determined using one or more of:
    a table,
    a chart, or
    a formula.

3. The method of claim 1, wherein selecting the subset of PSSCH messages comprises:
    selecting the subset of PSSCH messages based at least in part on the probabilities of receiving the subset of PSSCH messages satisfying a threshold probability.

4. The method of claim 1, further comprising:
    determining, based at least in part on the set of channel quality metrics, an order for decoding the subset of PSSCH messages.

5. The method of claim 1, further comprising:
    selecting, based at least in part on the set of channel quality metrics, a predetermined number of the set of PSSCH messages to include in the subset of PSSCH messages.

6. The method of claim 1, wherein the subset of PSSCH messages is selected based at least in part on modulation and coding schemes of the set of PSSCH messages.

7. The method of claim 1, further comprising:
    initiating a procedure for receiving a PSCCH message of the set of PSCCH messages;
    determining that a corresponding channel quality metric, of the set of channel quality metrics, satisfies a threshold; and
    terminating the procedure for receiving the PSCCH message before completing the procedure.

8. The method of claim 1, further comprising:
    initiating a procedure for receiving a PSSCH message of the subset of PSSCH messages;
    determining that an additional channel quality metric for the PSSCH message satisfies a threshold; and
    terminating the procedure for receiving the PSSCH message before completing the procedure.

9. A method of wireless communication performed by a user equipment (UE), comprising:
    initiating a procedure for receiving a physical sidelink shared channel (PSSCH) message; and
    terminating the procedure for receiving the PSSCH message before completing the procedure based at least in part on a determination that a channel quality metric for the PSSCH message satisfies a threshold.

10. The method of claim 9, further comprising:
    determining, based at least in part on the channel quality metric, a probability of receiving the PSSCH message; and
    determining to terminate the procedure based at least in part on the probability of receiving the PSSCH message.

11. The method of claim 10, wherein the probability of receiving the PSSCH message is determined using one or more of:
    a table,
    a chart, or
    a formula.

12. The method of claim 10, wherein determining to terminate the procedure based at least in part on the probability of receiving the PSSCH message comprises:
    determining to terminate the procedure based at least in part on the probability of receiving the PSSCH message satisfying a threshold probability.

13. The method of claim 12, wherein one or more of the threshold for the channel quality metric for the PSSCH message or the threshold probability are based at least in part on one or more of:
    a processing budget of the UE,
    a power setting of the UE,
    a heat setting of the UE,
    a batter metric of the UE, or
    a temperature metric of the UE.

14. The method of claim 9, wherein terminating the procedure is based at least in part on a modulation and coding scheme of the PSSCH message.

15. A user equipment (UE) for wireless communication, comprising:

a memory; and one or more processors operatively coupled to the memory, the memory and the one or more processors configured to:
- determine a set of channel quality metrics associated with a set of physical sidelink control channel (PSCCH) messages;
- determine, based at least in part on the set of channel quality metrics, probabilities of receiving the set of PSSCH messages; and
- select, based at least in part on the probabilities of receiving the set of PSSCH messages, a subset of PSSCH messages of the set of PSSCH messages.

16. The UE of claim 15, wherein the probabilities of receiving the set of PSSCH messages are determined using one or more of:
- a table,
- a chart, or
- a formula.

17. The UE of claim 15, wherein selecting the subset of PSSCH messages comprises:
- selecting the subset of PSSCH messages based at least in part on the probabilities of receiving the subset of PSSCH messages satisfying a threshold probability.

18. The UE of claim 15, wherein the one or more processors are further configured to:
- determine, based at least in part on the set of channel quality metrics, an order for decoding the subset of PSSCH messages.

19. The UE of claim 15, wherein the one or more processors are further configured to:
- select, based at least in part on the set of channel quality metrics, a predetermined number of the set of PSSCH messages to include in the subset of PSSCH messages.

20. The UE of claim 15, wherein the subset of PSSCH messages is selected based at least in part on modulation and coding schemes of the set of PSSCH messages.

21. The UE of claim 15, wherein the one or more processors are further configured to:
- initiate a procedure for receiving a PSCCH message of the set of PSCCH messages;
- determine that a corresponding channel quality metric, of the set of channel quality metrics, satisfies a threshold; and
- terminate the procedure for receiving the PSCCH message before completing the procedure.

22. The UE of claim 15, wherein the one or more processors are further configured to:
- initiate a procedure for receiving a PSSCH message of the subset of PSSCH messages;
- determine that an additional channel quality metric for the PSSCH message satisfies a threshold; and
- terminate the procedure for receiving the PSSCH message before completing the procedure.

23. A user equipment (UE) for wireless communication, comprising:
a memory; and
one or more processors operatively coupled to the memory, the memory and the one or more processors configured to:
- initiate a procedure for receiving a physical sidelink shared channel (PSSCH) message; and
- terminate the procedure for receiving the PSSCH message before completing the procedure based at least in part on a determination that a channel quality metric for the PSSCH message satisfies a threshold.

24. The UE of claim 23, wherein the one or more processors are further configured to:
- determine, based at least in part on the channel quality metric, a probability of receiving the PSSCH message; and
- determine to terminate the procedure based at least in part on the probability of receiving the PSSCH message.

25. The UE of claim 24, wherein the probabilities of receiving the PSSCH message are determined using one or more of:
- a table,
- a chart, or
- a formula.

26. The UE of claim 24, wherein the determination to terminate the procedure based at least in part on the probability of receiving the PSSCH message comprises:
- determining to terminate the procedure based at least in part on the probability of receiving the PSSCH message satisfying a threshold probability.

27. The UE of claim 26, wherein one or more of the threshold for the channel quality metric for the PSSCH message or the threshold probability are based at least in part on one or more of:
- a processing budget of the UE,
- a power setting of the UE,
- a heat setting of the UE,
- a batter metric of the UE, or
- a temperature metric of the UE.

28. The UE of claim 23, wherein the termination of the procedure is based at least in part on a modulation and coding scheme of the PSSCH message.

29. The UE of claim 15, wherein the probabilities of receiving the set of PSSCH messages are determined further based on modulation and coding schemes (MCSs) of the set of PSSCH messages.

30. The UE of claim 29, wherein the MCSs of the set of PSSCH messages are indicated in the set of PSCCH messages.

* * * * *